United States Patent [19]

Muramatsu

[11] Patent Number: 5,291,851
[45] Date of Patent: Mar. 8, 1994

[54] GAUGE FOR AUTOMOBILE

[75] Inventor: Masahiro Muramatsu, Shimada, Japan

[73] Assignee: Yazaki Corporation, Tokyo, Japan

[21] Appl. No.: 22,867

[22] Filed: Mar. 1, 1993

Related U.S. Application Data

[63] Continuation of Ser. No. 723,600, Jul. 1, 1991, abandoned.

[30] Foreign Application Priority Data

Jun. 29, 1990 [JP] Japan .................. 2-68476[U]

[51] Int. Cl.$^5$ .................. G01D 11/28; G01D 13/22
[52] U.S. Cl. .................. 116/286; 116/328; 116/DIG. 6
[58] Field of Search ............ 116/284, 286, 287, 288, 116/327, 328, 332, DIG. 5, DIG. 6, DIG. 26, DIG. 36; 362/23, 26, 27, 84

[56] References Cited

U.S. PATENT DOCUMENTS

| | | | |
|---|---|---|---|
| 2,290,278 | 7/1942 | Failla | 116/DIG. 5 X |
| 2,328,485 | 8/1943 | Ott | 116/DIG. 5 X |
| 3,129,691 | 4/1964 | Walker | 362/26 X |
| 3,622,774 | 11/1971 | Schuster et al. | 362/23 |
| 4,163,428 | 8/1979 | Ishikawa | 116/288 |
| 4,218,726 | 8/1980 | Fukasawa et al. | 362/23 |
| 4,233,927 | 11/1980 | Oikawa et al. | 362/26 X |
| 4,252,078 | 2/1981 | Fukasawa et al. | 116/DIG. 5 X |
| 4,258,643 | 3/1981 | Ishikawa et al. | 116/286 |
| 4,300,470 | 11/1981 | Furukawa | 116/332 |
| 4,329,736 | 5/1982 | Nelle et al. | 362/23 |
| 4,380,043 | 4/1983 | Takamatsu et al. | 362/26 |
| 4,646,208 | 2/1987 | Hayashi et al. | 362/84 X |
| 4,841,155 | 6/1989 | Ushida et al. | 362/84 X |
| 4,848,264 | 7/1989 | Knietzsch et al. | 116/328 X |
| 4,872,093 | 10/1989 | Shimizu | 116/DIG. 6 X |
| 4,872,415 | 10/1989 | Nakadozono et al. | 116/288 |
| 4,878,453 | 11/1989 | Inoue et al. | 116/DIG. 6 X |
| 5,040,480 | 8/1991 | Iwazaki et al. | 116/286 |
| 5,044,304 | 9/1991 | Tomita | 116/286 |
| 5,078,079 | 1/1992 | Ohta | 116/286 X |
| 5,142,456 | 8/1992 | Murphy | 116/288 X |
| 5,143,434 | 9/1992 | Ohta et al. | 116/286 X |
| 5,199,376 | 4/1993 | Pasco | 116/288 X |

FOREIGN PATENT DOCUMENTS

| | | |
|---|---|---|
| 3817874 | 12/1988 | Fed. Rep. of Germany. |
| 2024426 | 1/1980 | United Kingdom ......... 116/288 |
| 2185576 | 7/1987 | United Kingdom ......... 116/288 |

Primary Examiner—William A. Cuchlinski, Jr.
Assistant Examiner—John L. Beres
Attorney, Agent, or Firm—Keck, Mahin & Cate

[57] ABSTRACT

An automobile gauge in which the needle thereof is brightened so that the ability with which the driver can see and confirm the position of the needle is enhanced. A pigmented layer is formed on the indicator portion of the needle. Bulbs and a light-guiding plate disposed on the reverse surface of a dial, or a light emitting element provided at the back of the needle introduces light so as to brighten the needle. Because the indicator portion of the needle is shaped into a substantially long and slender cylinder, the light irradiated and guided into the indicator portion advances toward the end of the indicator portion while the total reflection thereof is repeated. Most of the irradiated light reaches the end of the indicator portion because very little of the irradiated light dissipates outside the needle. The entire indicator portion can be thereby brightened uniformly.

9 Claims, 3 Drawing Sheets

FIG. 3
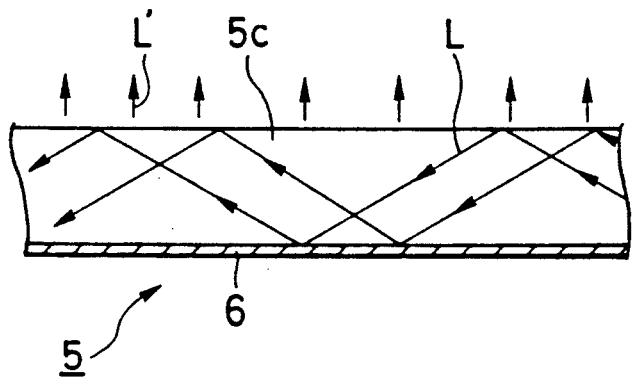
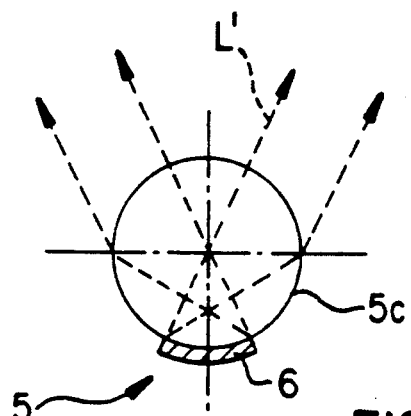
FIG. 4
FIG. 5
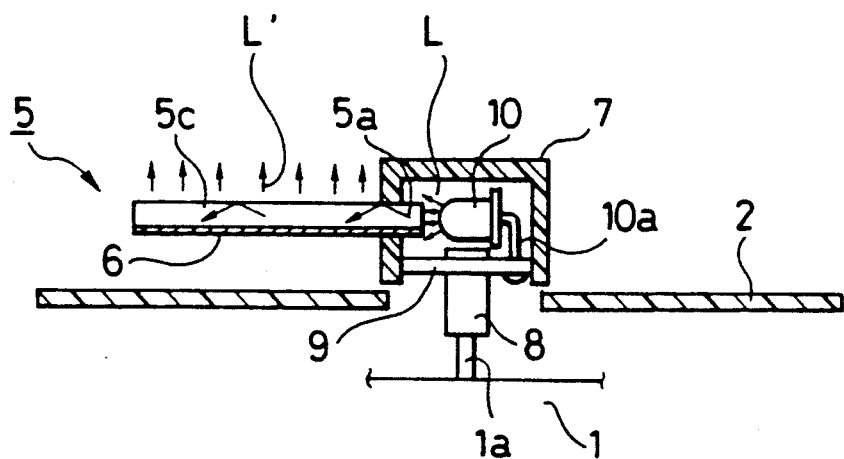

GAUGE FOR AUTOMOBILE

This is a continuation of application Ser. No. 07/723,600, filed Jul. 1, 1991, now abandoned.

BACKGROUND OF THE INVENTION

1. Field of the Invention

The present invention relates to a gauge for an automobile and, more particularly, to a gauge for an automobile in which the needle thereof is brightened.

2. Description of the Related Art

Automobile gauges have hitherto been known which include needles secured to needle shafts rotatively driven in correspondence to what is measured; dials on which letters, graduations and the like are formed; light-guiding plates for introducing light to the reverse surfaces of the dials, which light illuminates the letters, the graduations and other components; and light sources. The needles themselves are brightened to enhance the ability with which the driver can see and confirm the positions of the needles at night.

Light irradiated by a light source is reflected by a reflecting face of a light-guiding plate, and is introduced to the base portion of the needle. It is reflected again by another reflecting face disposed in the base portion, and is guided into a photoconductive indicator portion of a tapered, square post-like needle. The light reaches the end of the needle while it is repeatedly reflected in the indicator portion. A layer made of a fluorescent coating material (hereinafter referred to simply as a fluorescent layer) is formed on the reverse surface of the indicator portion. The irradiated light impinging on the fluorescent layer is irregularly reflected, and the indicator portion is thereby brightened, so that the driver can see and confirm the position of the needle.

In such a conventional structure, however, since the indicator portion of the needle is shaped in the tapered, square post-like configuration, the irradiated light is likely to dissipate outside the needle as it advances toward the end of the indicator portion while it is repeatedly reflected. Thus light sufficient for illumination does not reach the end of the indicator portion, resulting in reduced illumination as the light approaches the end of the indicator portion. Furthermore, the wide area of the fluorescent layer, to which a fluorescent coating material is applied, is formed on the entire reverse surface of the indicator portion of the needle. When the irradiated light impinges on the wide area of the fluorescent layer, it is absorbed by the latter, and is lost as a result. This leads to a problem in that the indicator portion is not brightened fully.

If such a disadvantage is compensated for, a thick indicator portion must be shaped so as to introduce a large amount of light into the indicator portion, seriously limiting high-quality design options.

The present invention has been made in view of the above. The object of the invention is therefore to provide an automobile gauge equipped with a needle which has a slender configuration and a high-quality appearance. The indicator portion of the needle is uniformly brightened, and the driver can see and confirm the position of the needle.

SUMMARY OF THE INVENTION

To achieve the above object, this invention provides an automobile gauge in which a needle having the indicator portion with a pigmented layer, is secured to a needle shaft of the main body of a gauge, the indicator portion being brightened by introduced light, wherein the indicator portion has a substantially long and slender cylindrical configuration.

According to this invention, because of the shape of substantially long and slender cylindrical indicator portion, the light irradiated and introduced into the indicator portion advances toward the end of the indicator portion while it is repeatedly reflected. During the advancement of the light, most of the irradiated light reaches the end of the indicator portion because very little of the irradiated light is given off outside the needle. The entire indicator portion can be thereby brightened uniformly.

Also, because of the "lens effect" of the indicator portion, the entire indicator portion can be brightened. The driver can thus see and confirm the position of the needle. A narrow fluorescent layer can be formed on the reverse surface of the indicator portion. The amount of the irradiated light absorbed by the fluorescent layer can be reduced, thereby limiting the loss of light.

BRIEF DESCRIPTION OF THE DRAWINGS

FIGS. 3 and 4 are views each showing the state of light inside the needle;

FIG. 5 is a cross-sectional view essentially showing an automobile gauge according to another embodiment of this invention.

DESCRIPTION OF THE PREFERRED EMBODIMENTS

Figure 1:
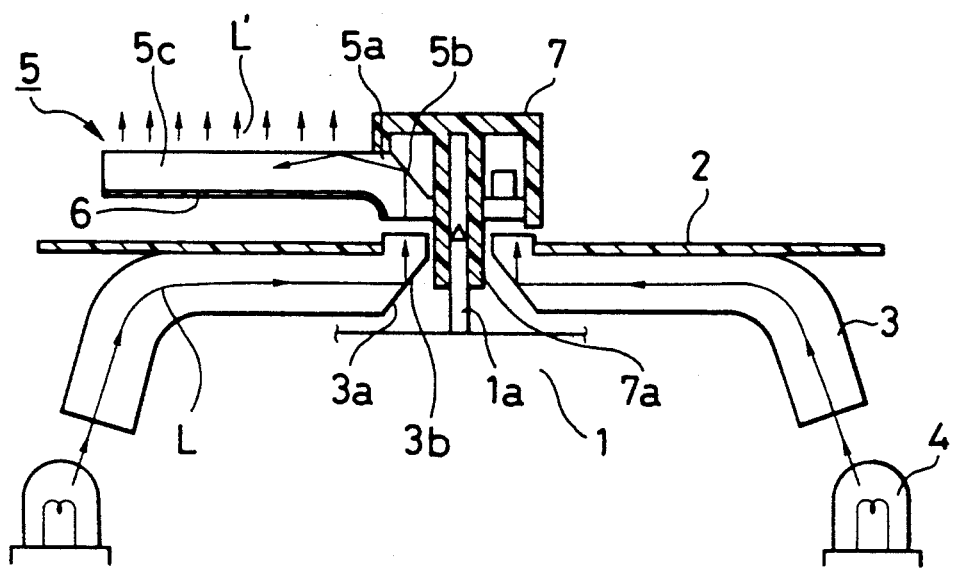
FIG. 1 is a cross-sectional view essentially showing an automobile gauge in accordance with an embodiment of the present invention.
Figure 2:
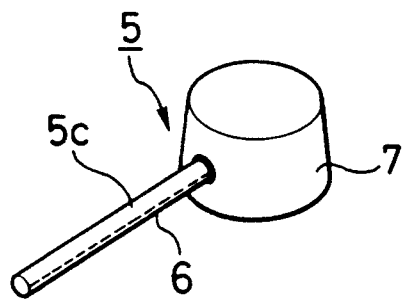
FIG. 2 is a perspective view of a needle shown in the embodiment of FIG. 1.

The present invention will be described below in accordance with the preferred embodiments shown in the accompanying drawings.

With reference to FIGS. 1 through 5 showing the embodiments of the invention, an automobile gauge is equipped with a main body 1 and a needle 5. The main body 1 has a needle shaft 1a and rotatively drives it in correspondence to what is measured. The needle 5 is secured to the needle shaft 1a and a dial 2 on which letters and graduations are formed, and points to a predetermined location on the dial 2 as the needle shaft 1a rotates. A light-guiding plate 3, made of an acrylic resin or the like, is disposed on the side of the reverse surface of the dial 2. Light L irradiated by bulbs 4 is led to the reverse surface of the dial 2, whereby the letters, the graduations and the like are illuminated. The bulbs 4 are used as light sources that are arranged close to the ends of the light-guiding plate 3. A central opening 3a is formed in the light-guiding plate 3. The needle shaft 1a on the main body 1 of the gauge disposed on the side of the reverse surface of the light-guiding plate 3 is positioned inside the central opening 3a. A supporting portion 7a formed integrally with a needle cap 7 is mated with the needle shaft 1a. The needle 5 is made of a material such as an acrylic resin, and is composed of a base portion 5a and an indicator portion 5c. The base portion 5a having a reflecting face 5b is retained by the supporting portion 7a. The indicator portion 5c extends from the base portion 5a in a long and slender cylindrical manner. A narrow fluorescent layer 6 is formed on the entire length of the reverse surface of the indicator portion 5c. The needle cap 7 covers the needle 5 on the side of the base portion 5a, and is shaped into a substantial cylinder to prevent light L from leaking outside as the light advances from the light-guiding plate 3 to the indicator portion 5c.

Reflecting faces 3b are formed in the central opening 3a of the light-guiding plate 3, which reflecting faces 3b are used for reflecting the light L irradiated by the bulbs 4 at an angle of substantially 90 degrees so as to guide it to the base potion 5a of the needle 5.

The light L thus guided to the base portion 5a is again reflected by the reflecting face 5b at an angle of substantially 90 degrees, and is guided further into the indicator portion 5c. As shown in FIG. 3, the irradiated light L advances toward the end of the indicator portion 5c while the total reflection thereof is repeated. At this time, the irradiated light L which is being repeatedly reflected inside the indicator portion 5c impinges on the fluorescent layer 6, and is thus reflected irregularly. Irregularly reflected light L' is caused to emanate in fixed directions from the indicator portion 5c because of the "lens effect" of the indicator portion 5c. When the thus-emanated light L' reaches the eyes of the driver, the entire indicator portion 5c is brightened, so that he can see and confirm the position of the needle.

Thus, in this embodiment, because the indicator portion 5c has a somewhat long and slender cylindrical configuration, the irradiated light L introduced into the indicator portion 5c advances toward the end of the portion 5c while the total reflection thereof is repeated. While the light L is advancing, very little irradiated light L dissipates outside the needle 5, thus reaching the end of the indicator portion 5c, whereby the entire needle 5 is brightened uniformly.

Because of the indicator portion 5c in a circular cross section, the "lens effect" thereof brightens the entire surface of the indicator portion 5c so that the driver can see and confirm the position of the needle. The fluorescent layer 6 on the reverse surface of the indicator portion 5c can be shaped into a narrow configuration. The amount of irradiated light L absorbed by the fluorescent layer 6 is reduced, thereby limiting the loss of the light. Since the needle 5 can be brightened in a narrow and uniform manner, it is possible to obtain the needle 5 that has a high-quality appearance, and the ability with which the driver can see and confirm the position of the needle is enhanced.

FIG. 5 shows another embodiment of this invention, in which a needle support 8 is mated under pressure with the end of a needle shaft 1a of a main body 1 installed on the side of the reverse surface of a dial 2. A printed board 9 is affixed to the needle support 8. A light emitting element 10, such as a light emitting diode or an incandescent lamp, is disposed over the printed board 9 in such a manner that the lead 10a of the element 10 is connected, by an electrical or mechanical method such as a soldering method, to a conductive pattern on the printed board 9. A cylindrical needle cap 7 is fitted from above to the printed board 9 over which the light emitting element 10 is disposed. It covers the printed board 9, the light emitting element 10, a part of a needle 5 on the side of a base portion 5a, and other portions.

A cylindrical indicator portion 5c of the needle 5, which is long and slender and made of an acrylic resin or the like, is fitted into the peripheral surface of the needle cap 7. The base portion 5a of the needle 5 is disposed facing the light emitting element 10. Light L irradiated by the light emitting element 10 is introduced into the indicator portion 5c through the base portion 5a. A narrow fluorescent layer 6 is formed on the entire length of the reverse surface of the indicator portion 5c.

In this embodiment, when an electric current flows from the main body 1 to the light emitting element 10 via a current feeding structure (not shown), thus causing the latter to light, the light L illuminated by the light emitting element 10 is directly introduced into the indicator portion 5c through the base portion 5a of the needle 5. The light L advances toward the end of the indicator portion 5c while the total reflection thereof is repeated. The irradiated light L (repeatedly reflected inside the indicator portion 5c) impinges on the fluorescent layer 6 formed on the reverse surface of the indicator portion 5c, and is thus reflected irregularly. Irregularly reflected light L' is caused to emanate in fixed directions from the indicator portion 5c because of the "lens effect" of the indicator portion 5c.

Also in this embodiment, since the needle 5 can be brightened in a narrow and uniform fashion, it is possible to obtain the needle 5 that has a high-quality appearance, and the ability with which the drive can see and confirm the position of the needle is enhanced.

Figure 6:
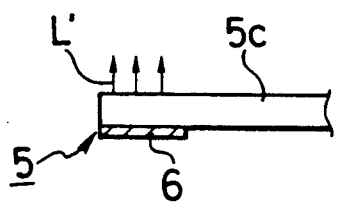
FIGS. 6 through 9 are views each showing an example in which a modification is made to the shape of the indicator portion of the needle.

FIGS. 6 through 9 are views each showing an example in which a modification is made to the shape of an indicator portion 5c of the needle 5. FIG. 6 illustrates an indicator portion 5c in which only the end of the reverse surface thereof is formed of the narrow fluorescent layer 6. With this arrangement, it is possible to brighten only the end of the needle 5 and to obtain the needle 5 of a new design.

Figure 7:
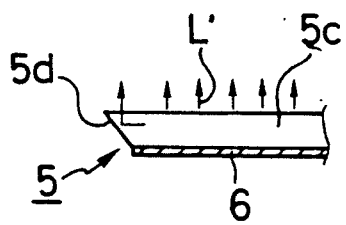

FIG. 7 illustrates an indicator portion 5c whose entire reverse surface is formed of the narrow fluorescent layer 6. The end of the indicator portion 5c is shaped into a tapered portion 5d. This construction causes light reaching the end of the indicator portion 5c to be reflected by the tapered portion 5d at an angle of substantially 90°, thus directing the light to the driver. Therefore, the entire needle 5, particularly its end, can be brightened more intensely than in the conventional art. Thus the ability with which the driver can see and confirm the position of the needle is more enhanced than in the conventional art.

Figure 8:
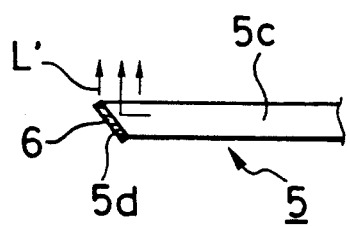

FIG. 8 depicts an indicator portion 5c with its end shaped into a tapered portion 5d on which the fluorescent layer 6 is formed. With this structure, light is reflected with the aid of the fluorescent layer 6 toward the driver, thus intensely brightening only the end of the needle 5. Thus, with a new design of this needle, it is possible to obtain a needle by which the ability of the driver to see and confirm the position of the needle is more enhanced than in the conventional art.

Figure 9:
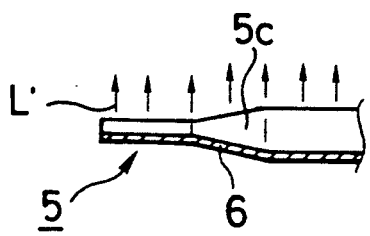

FIG. 9 shows an indicator portion 5c with its shape tapering toward its end. The narrow fluorescent layer 6 is formed on the reverse surface of the indicator portion 5c. This structure permits irradiated light to concentrate as it approaches the converging end of the indicator portion 5c, which, in particular, can be brightened intensely. The ability with which the driver can see and confirm the position of the needle is more enhanced than in the conventional art.

As has been described above, in the automobile gauge according to the present invention, since the indicator portion of the needle is shaped into a substantially long and slender cylinder, irradiated light guided into the indicator portion advances toward the end of the indicator portion while the total reflection thereof is repeated. While the irradiated light is advancing, very little irradiated light dissipates outside the needle, consequently reaching the end of the indicator portion. The entire needle can thus be uniformly brightened. The "lens effect" of the indicator portion brightens the entire indicator portion. The driver can see and confirm the position of the needle. The fluorescent layer can be formed into a narrow configuration, and the amount of the irradiated light absorbed by the fluorescent layer can be reduced. It is thus possible to limit the loss of light, thereby uniformly brightening the narrow needle. The needle having a high-quality appearance is obtainable, and the ability which the driver can see and confirm the position of the needle is enhanced.

What is claimed is:

1. Automobile gauge comprising:
   a main body with a needle shaft to be rotated in correspondence to what is measured;
   a dial;
   a needle having a base portion operatively cooperating with said needle shaft, and a solid elongate indicator portion with a pigmented layer forming a strip parallel to the length of the indicator portion, for pointing to a predetermined location on said dial in correspondence to what is measured; and
   means for introducing light to said indicator portion for illuminating the indicator portion substantially uniformly along its length, said light being reflected back and forth along the length of the indicator portion producing a lens effect thereof, the indicator portion being shaped into a rectilinear cylindrical configuration of circular cross-section and constant diameter throughout its length.

2. An automobile gauge according to claim 1, wherein said means for introducing light include a light-guiding plate provided on the side of a reverse surface of said dial, and bulbs arranged close to the ends of said light-guiding plate.

3. An automobile gauge according to claim 1, wherein the base portion of the needle includes a needle cap and a supporting portion formed integrally with said needle cap for retaining the base portion of said needle mated with said needle shaft.

4. An automobile gauge according to claim 1, wherein said means for introducing light include a light emitting element that is disposed facing the base portion of said needle.

5. An automobile gauge according to claim 4, wherein said light emitting element is attached to a printed board that is disposed over a needle support mated under pressure with the end of said needle shaft.

6. An automobile gauge according to claim 5, wherein a cylindrical needle cap is fitted to said printed board, and a peripheral surface of said needle cap retains said needle.

7. An automobile gauge according to claim 1, wherein said pigmented layer is a layer made of a fluorescent coating material.

8. An automobile gauge according to claim 1, wherein said pigmented layer is formed on the entire length of a reverse surface of said indicator portion.

9. An automobile gauge according to claim 1, wherein said pigmented layer is formed only on the end of a reverse surface of said indicator portion.

* * * * *